US009459764B1

(12) United States Patent
Rosner (10) Patent No.: US 9,459,764 B1
(45) Date of Patent: Oct. 4, 2016

(54) SYSTEM, METHOD, AND COMPUTER PROGRAM FOR SELECTING AT LEAST ONE PREDEFINED WORKFLOW BASED ON AN INTERACTION WITH A USER

(75) Inventor: Dov Rosner, Kfar Yona (IL)

(73) Assignee: Amdocs Software Systems Limited, Dublin (IE)

( * ) Notice: Subject to any disclaimer, the term of this patent is extended or adjusted under 35 U.S.C. 154(b) by 1516 days.

(21) Appl. No.: 12/268,807

(22) Filed: Nov. 11, 2008

(51) Int. Cl.
*G06F 3/048* (2013.01)
*G06F 3/0482* (2013.01)

(52) U.S. Cl.
CPC .................................. *G06F 3/0482* (2013.01)

(58) Field of Classification Search
USPC .................................................. 715/789, 850
See application file for complete search history.

(56) References Cited

U.S. PATENT DOCUMENTS

| | | | | |
|---|---|---|---|---|
| 5,918,226 | A * | 6/1999 | Tarumi et al. | |
| 6,016,336 | A * | 1/2000 | Hanson | 379/88.23 |
| 6,102,870 | A * | 8/2000 | Edwards | 600/558 |
| 6,115,640 | A * | 9/2000 | Tarumi | 700/99 |
| 6,236,977 | B1 * | 5/2001 | Verba et al. | 705/7.32 |
| 7,379,537 | B2 * | 5/2008 | Bushey et al. | 379/88.01 |
| 7,962,544 | B2 * | 6/2011 | Torok et al. | 709/200 |
| 8,086,708 | B2 * | 12/2011 | Breitgand et al. | 709/223 |
| 2001/0014146 | A1 * | 8/2001 | Beyda et al. | 379/88.25 |
| 2002/0138577 | A1 * | 9/2002 | Teng et al. | 709/205 |
| 2002/0147746 | A1 * | 10/2002 | Lee | 707/513 |
| 2003/0103608 | A1 * | 6/2003 | Pearson et al. | 379/88.18 |
| 2003/0142128 | A1 * | 7/2003 | Reulein et al. | 345/742 |
| 2003/0185195 | A1 * | 10/2003 | Dowling et al. | 370/349 |
| 2004/0068424 | A1 * | 4/2004 | Lee et al. | 705/7 |
| 2004/0098664 | A1 * | 5/2004 | Adelman et al. | 715/500 |
| 2004/0122941 | A1 * | 6/2004 | Creamer et al. | 709/224 |
| 2005/0002515 | A1 * | 1/2005 | Mewhinney et al. | 379/266.08 |
| 2005/0060662 | A1 * | 3/2005 | Soares et al. | 715/810 |
| 2007/0067373 | A1 * | 3/2007 | Higgins et al. | 707/206 |
| 2008/0028363 | A1 * | 1/2008 | Mathew | 717/104 |
| 2008/0040676 | A1 | 2/2008 | Garg et al. | 715/762 |
| 2008/0168529 | A1 * | 7/2008 | Anderson et al. | 726/1 |
| 2008/0235706 | A1 * | 9/2008 | Brown et al. | 718/106 |
| 2009/0049389 | A1 * | 2/2009 | Kuzmanovic | 715/745 |
| 2009/0100337 | A1 * | 4/2009 | Commarford et al. | 715/708 |
| 2009/0119618 | A1 * | 5/2009 | Norman et al. | 715/812 |
| 2009/0125884 | A1 * | 5/2009 | Hsu et al. | 717/120 |
| 2009/0150184 | A1 * | 6/2009 | Spahn | 705/3 |
| 2009/0281865 | A1 * | 11/2009 | Stoitsev | 705/9 |
| 2010/0121861 | A1 * | 5/2010 | Marsden et al. | 707/752 |
| 2010/0122312 | A1 * | 5/2010 | Green et al. | 726/1 |
| 2010/0218134 | A1 * | 8/2010 | B'Far et al. | 715/780 |
| 2010/0332581 | A1 * | 12/2010 | Mills et al. | 709/202 |
| 2011/0004837 | A1 * | 1/2011 | Copland et al. | 715/765 |
| 2011/0055673 | A1 * | 3/2011 | Teng et al. | 715/200 |
| 2011/0258550 | A1 * | 10/2011 | Dinh-Trong et al. | 715/736 |
| 2011/0271219 | A1 * | 11/2011 | Krishnan et al. | 715/771 |

FOREIGN PATENT DOCUMENTS

EP   1 591 942   11/2005   ............ G06F 17/60

\* cited by examiner

*Primary Examiner* — Ryan Pitaro
(74) *Attorney, Agent, or Firm* — Zilka-Kotab, PC (57) ABSTRACT

A system, method, and computer program product are provided for selecting at least one predefined workflow based on an interaction with a user. In operation, a plurality of predefined workflows are stored. Additionally, information regarding an interaction with a user is received. Furthermore, at least one of the predefined workflows is selected, based on the information.

9 Claims, 9 Drawing Sheets

Activate New Subscription

Newly allocated number: 555-1234-5678  Select another number

Name: Mr. [ ▼ ]  [        ]
Social Security: [        ]
Birthday: Day: [1 ▼]  Month: [1 ▼]  Year: [1950 ▼]
Contact Phone: [        ]  Add other contacts  optional
Address: [        ]
City: [        ]
State: [Please select ▼]
Zip: [        ]
Preferred Language: ● English  ○ Spanish  ○ Chinese Reason for Call: [Please select ▼]
Notes: [                    ]
optional

[ Activate ]   Cancel

Callout f (top): f. Sub-tasks (non mainstream) are supported by launch in context

---

Surrounding interface:

Crème dashboard | >>

Next Call  [ ▶ ]  Hang Up

▶ Notifications  ∧ ∨
IVR > Prepaid > Activation
Waited >3 min.   System outages

▶ Activate New Subscription

SIM Number: [       ] ?
IMEI Code: [       ] ?
Required if device is purchased

Phone Number:
● Allocate new number
○ Port-In number
○ Resume existing number

[ Continue ]

▲ Advisor

Add Note where is it  [ GO ]

Callout e (lower left): e. Additional transaction data is presented in a "light box"

Callout d (lower right): d. Agent enters key data and selects continue

SYSTEM, METHOD, AND COMPUTER PROGRAM FOR SELECTING AT LEAST ONE PREDEFINED WORKFLOW BASED ON AN INTERACTION WITH A USER

FIELD OF THE INVENTION

The present invention relates to workflows, and more particularly to selecting workflows based on user interaction.

BACKGROUND

Presently, most user-intensive software systems present a menu of options based on the capabilities that they offer. These systems provide the users with comprehensive screens of data objects and user actions that encompass a wide range of possible needs (e.g. frequent needs, rare needs, etc.). This results in data overload and unnecessary complexity. There is thus a need for addressing these and/or other issues associated with the prior art.

SUMMARY

A system, method, and computer program product are provided for selecting at least one predefined workflow based on an interaction with a user. In operation, a plurality of predefined workflows are stored. Additionally, information regarding an interaction with a user is received. Furthermore, at least one of the predefined workflows is selected, based on the information.

DETAILED DESCRIPTION

Figure 1:
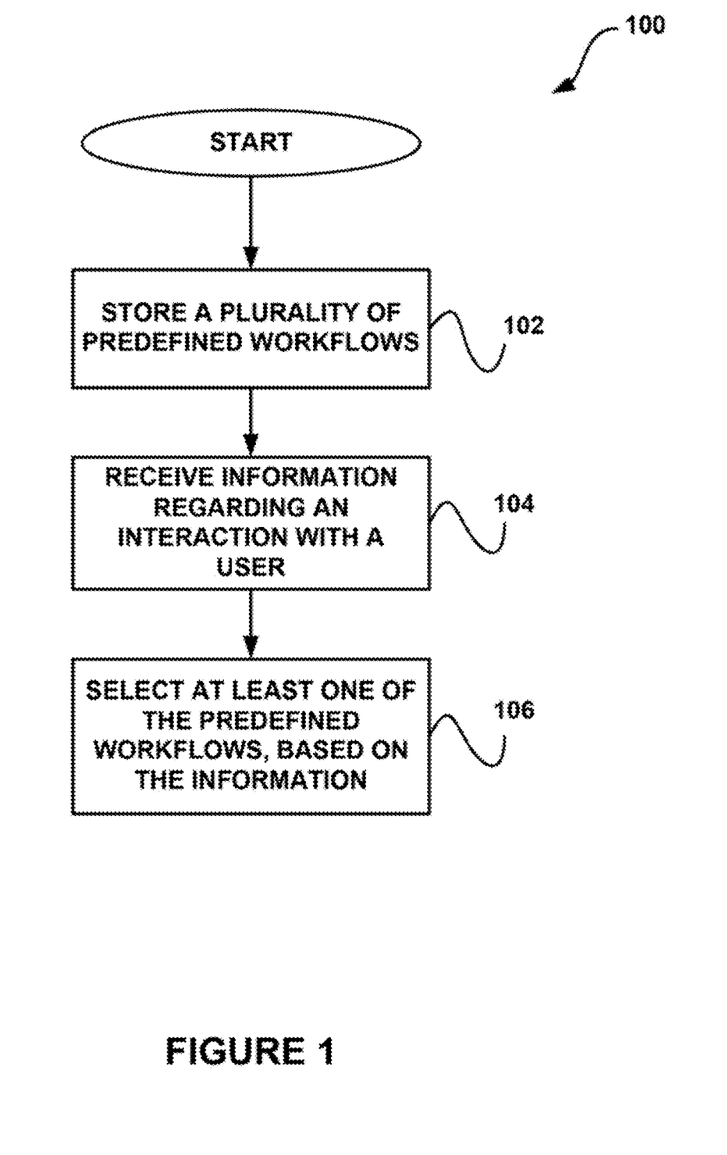
FIG. 1 shows a method for selecting at least one predefined workflow based on an interaction with a user, in accordance with one embodiment.

FIG. 1 shows a method 100 for selecting at least one predefined workflow based on an interaction with a user, in accordance with one embodiment. As shown, a plurality of predefined workflows are stored. See operation 102.

In the context of the present description, a workflow refers to any sequence of tasks to be performed. For example, the workflow may include a sequence of operations declared as work of a person, work of a simple or complex mechanism, work of a group of people, work of an organization or other entity, and/or work of one or more systems or machines, etc.

Additionally, information regarding an interaction with a user is received. See operation 104. The information may include any information regarding an interaction with a user.

For example, in one embodiment, the information may describe user behavior. In another embodiment, the information may describe user behavior associated with a plurality of the users. In still another embodiment, the information may describe at least one business flow.

Furthermore, the information may be collected in real-time or near real-time. Once the information regarding the interaction with the user is received, at least one of the predefined workflows is selected, based on the information. See operation 106.

In one embodiment, the selecting may include predicting at least one of the workflows that the user is to perform. In this case, the predicting may include examining tasks previously performed by the user in the context of a workflow or other techniques described below. Furthermore, the prediction may include utilizing a prediction algorithm (e.g. an 80-20 rule, etc.).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
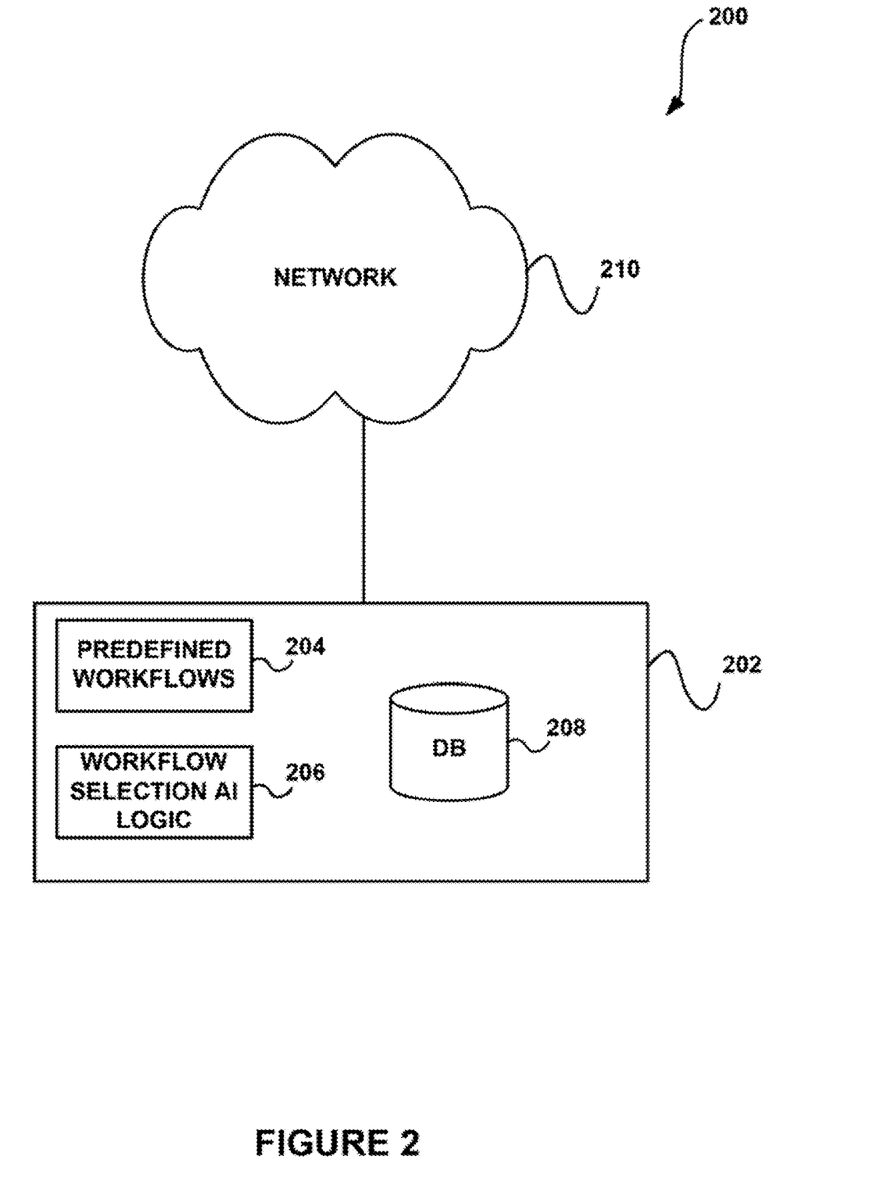
FIG. 2 shows a system for selecting at least one predefined workflow based on an interaction with a user, in accordance with one embodiment.

FIG. 2 shows a system 200 for selecting at least one predefined workflow based on an interaction with a user, in accordance with one embodiment. As an option, the system 200 may be implemented in the context of the details of FIG. 1. Of course, however, the system 200 may be implemented in any desired environment. It should also be noted that the aforementioned definitions may apply during the present description.

As shown, a subsystem 202 is provided. The subsystem 202 includes a plurality of predefined workflows 204. Additionally, the subsystem 202 includes workflow selection logic 206.

Still yet, the subsystem may include memory 208. The memory may include any memory capable of storing data. As an option, the memory 208 may be utilized to store the workflows 204 and/or the workflow selection logic 206.

The subsystem 202 may include any device or system capable of storing workflows and/or logic. For example, in various embodiments, the subsystem 202 may take the form of a desktop computer, lap-top computer, a personal digital assistant (PDA) device, a mobile phone device, and various other devices. The subsystem 202 may also include a software system capable of utilizing an application programming interface (API) to communicate with a user. The user may utilize a graphic user interface (GUI) to interface with the software system, for example.

The subsystem 202 may also be in communication with a network 210. The network 210 may include a telecommunications network, a local area network (LAN), a wireless network, a wide area network (WAN) such as the Internet, peer-to-peer network, cable network, and various other networks.

It should be noted that, in various embodiments, the subsystem 202 may include additional components. Furthermore, the components of the subsystem 202 may be included as the same or separate modules. Still yet, the inclusion of the components and functionality described in the context of FIG. 2 may vary in different embodiments.

In operation, the subsystem 202 may be utilized to simplify and streamline a workload of a user by predicting a next most common action and exposing the most likely task path based on actual operational statistics. For example, a user interface may be redefined for one or more software systems by dynamically analyzing the operational statistics to determine a series of actions that users (e.g. operators, etc.) are most likely to utilize. By monitoring the detailed behavior of business flows, individual behavior, and groups of agents, a granular approach may be provided for adapting the behavior of the software system to achieve specific business targets. In this way, a fast Average Handling Time (AHT) may be achieved by exposing the next probable actions and data in a manner that will enable optional efficiency of the most common (e.g. mainstream, etc.) workflows, while still allowing full access to other possible tasks/data though classic designs.

Figure 3:
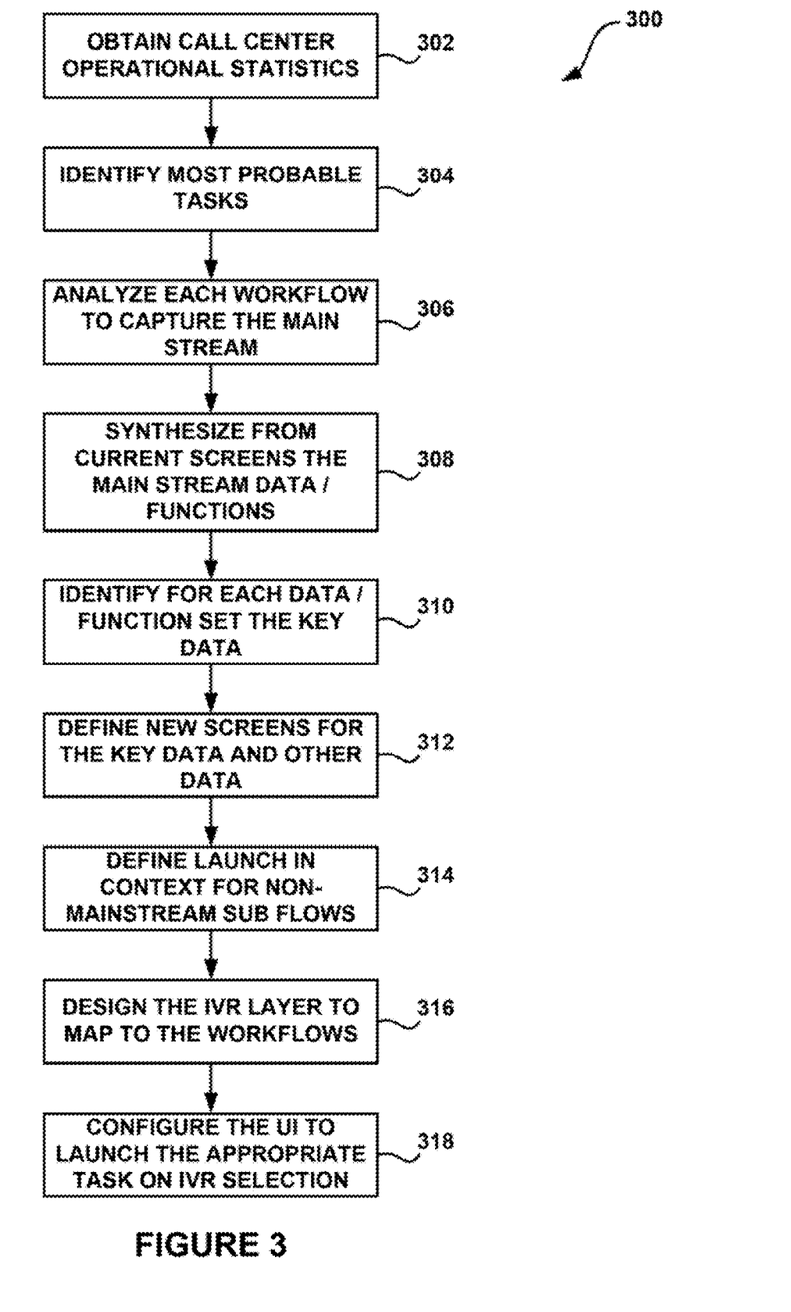
FIG. 3 shows an implementation time method for selecting at least one predefined workflow based on an interaction with a user, in accordance with one embodiment.

FIG. 3 shows an implementation time method 300 for selecting at least one predefined workflow based on an interaction with a user, in accordance with one embodiment. As an option, the method 300 may be implemented in the context of the details of FIGS. 1-2. Of course, however, the method 300 may be carried out in any desired environment. Further, the aforementioned definitions may equally apply to the description below.

As shown, call center operational statistics are obtained. See operation 302. For example, a call center may track information regarding an interaction with a user. In this case, the information may include operational statistics. The operational statistics may include any statistics associated with the operation of the user or a group affiliated with the user. The statistics may relate to specific users, departments, geographical regions, the entire operation, etc., as required by the business to identify meaningful statistical patterns.

The most probable tasks are then identified. See operation 304. For example, the tasks may include a first set of tasks that are more probable than a second set of tasks.

In one embodiment, the most probable tasks may be identified using the 80-20 rule. In the context of the present description, the 80-20 rule refers to a rule that, in the context of call center agents, 20 percent of the activities the agent can do consume 80 percent of the completion time and the remaining 80 percent of the activities the agent can do may be used no more than 20 percent of the completion time. Using the techniques described herein, identification, optimization, and the enabling of a predictive selection of the 20% of the tasks that consume 80% of the agent's time may occur to reduce average handle time (AHT) where it has the most impact on reducing AHT.

Once the most probable tasks are identified, each workflow is analyzed to capture the main stream. See operation 306. In this case, the operational statistics may be analyzed. For example, computer code may be provided for analyzing the operational statistics. Another technique is through a variety of other techniques, such as user observation, questionnaires, or optimized processes defined by the business owners.

It should be noted that, in one embodiment, operations 302-306 may be automated once an adequate repository of workflows is created. This will allow the creation of automatic alerts when operational statistics change.

Once each workflow is analyzed to capture the main stream, current screens are synthesized from the main stream data and/or functions. See operation 308. The key data and/or functions are then identified for each data/function. See operation 310.

For example, each task flow or a selected workflow may be analyzed to determine a main set of data. In this case, a current user interface may be utilized to determine the main set of data. Key data may then be identified for the main set of data.

Once the key data and/or functions are identified for each data/function, new screens are defined for the key data and other data. See operation 312. For example, new user interfaces may be defined for the key data.

A launch in context of legacy systems is then defined for executions of non-mainstream sub flows. This enables the maintaining of an optimized sizing and behavior, while enabling the user access to less frequent sub-flows and tasks (80% of the systems' capabilities that are needed just 20% of the time). See operation 314. For the mainstream flow, an interactive voice response (IVR) layer is designed to map to the workflows. See operation 316. In one embodiment, the IVR layer may be designed for 20% of the system's workflows. Other (less frequent) workflows are accessed via the IVR by selecting the option typically defined as the last one (e.g. "for other needs, please press 9 for agent assistance").

Once the IVR layer is designed to map to the workflows, the user interface (UI) is configured to launch the appropriate task on the IVR selection. See operation 318. As an option, operations 302-318 may be performed on a reoccurring basis.

For example, the operations 302-318 may be performed on a quarterly basis. As another option, the operations 302-318 may be performed on an annual basis. Of course, the operations 302-318 may be performed on any user defined basis.

It should be noted that, in one embodiment, an automatic alert may be created when operational statistics change, and the IVR layer, or implementation of the new workflows may be reconfigured. Furthermore, the predictive component of identifying the most probable tasks may be based on an analysis of actual operational statistics, predicting the most common workflows a call center agent is likely to be required to perform. In the context of the present description, an agent refers to any individual or entity capable of functioning as an agent.

Figure 4:
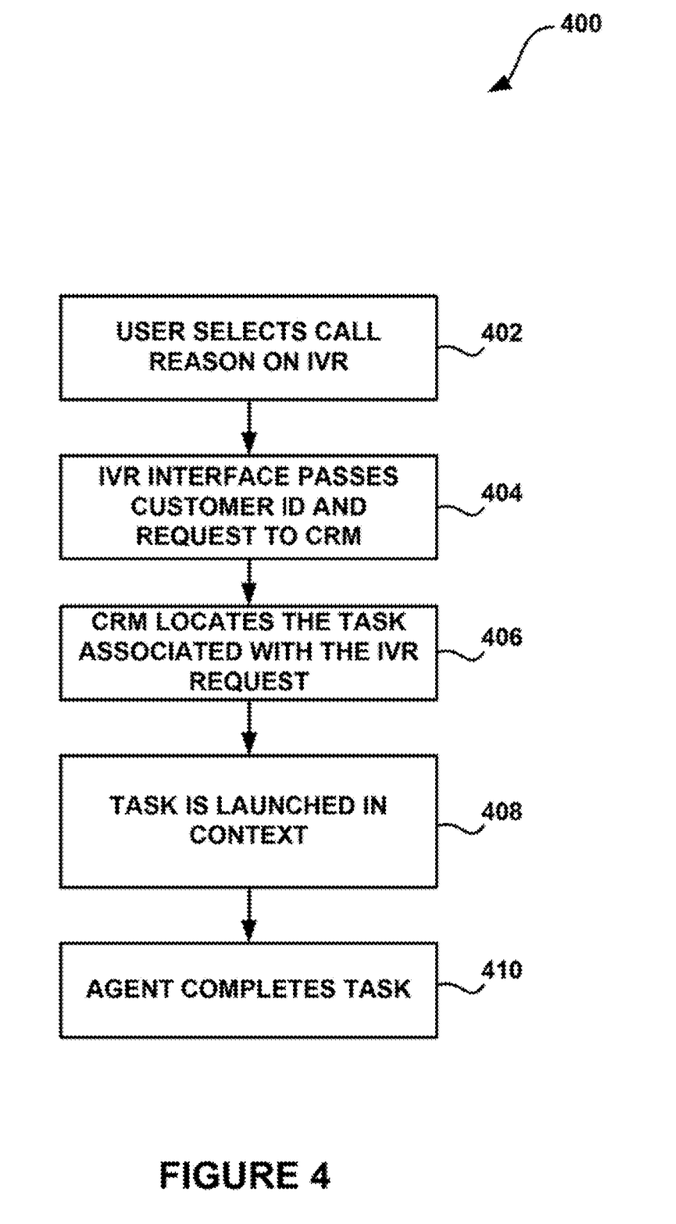
FIG. 4 shows a run time method for selecting at least one predefined workflow based on an interaction with a user, in accordance with one embodiment.

FIG. 4 shows a run time method 400 for selecting at least one predefined workflow based on an interaction with a user, in accordance with one embodiment. As an option, the method 400 may be implemented in the context of the details of FIGS. 1-3. Of course, however, the method 400 may be carried out in any desired environment. Again, the aforementioned definitions may equally apply to the description below.

As shown, a user selects a call reason on an interactive voice response interface. See operation 402. The interactive voice response interface then passes a customer identifier associated with the user and a request associated with the call reason to a Customer Relationship Management (CRM) system. See operation 404.

In other words, a user identifier may be communicated to a customer relationship manager. As an option, the user identifier may be communicated from the interactive voice response interface as part of an interactive voice response request.

Once this information is passed to the CRM, the CRM system locates the task associated with the interactive voice response request. See operation 406. The task is then launched in the context (e.g. of the user/customer, etc.). See operation 408.

The agent then completes the task. See operation 410. It should be noted that, in one embodiment, the interface may be pre-optimized in an implementation stage.

Figure 5:
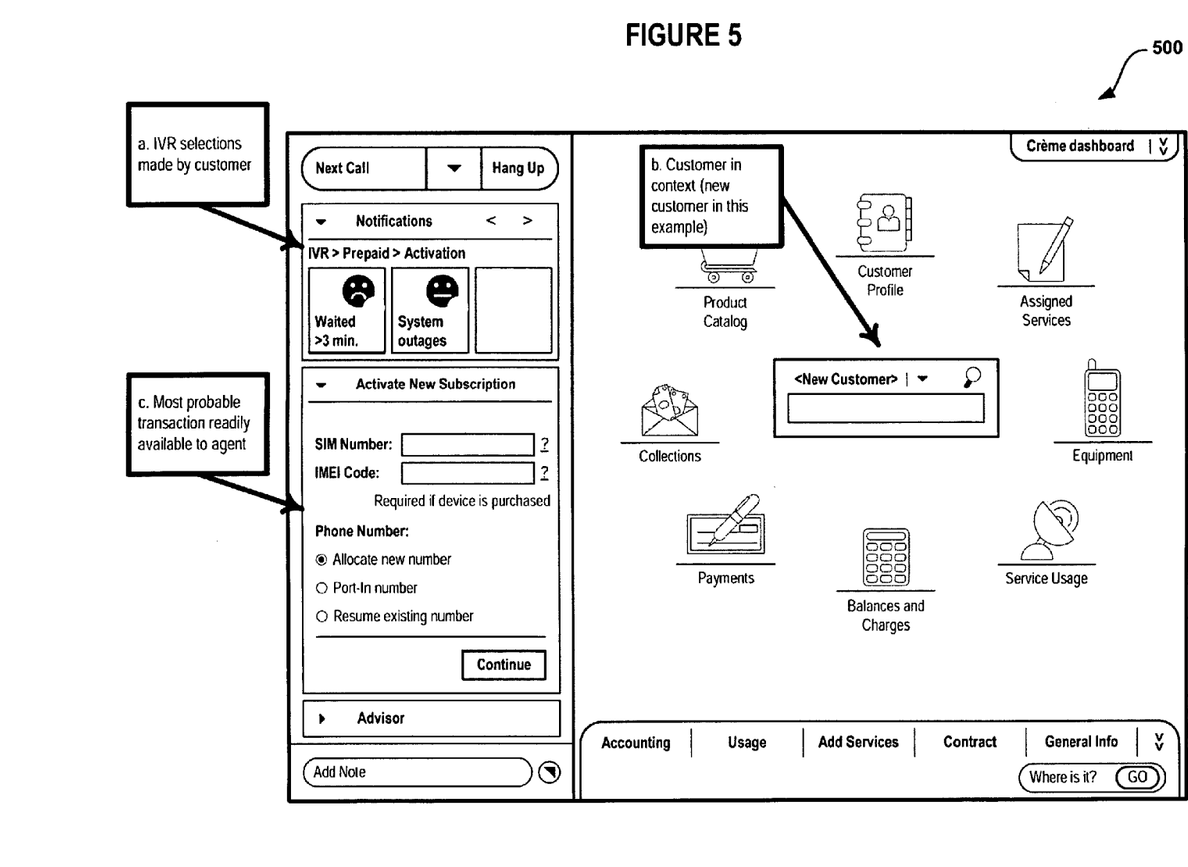
FIG. 5 shows a run time interface for selecting at least one predefined workflow based on an interaction with a user, in accordance with one embodiment.

FIG. 5 shows a run time interface 500 for selecting at least one predefined workflow based on an interaction with a user, in accordance with one embodiment. As an option, the interface 500 may be implemented in the context of the details of FIGS. 1-4. Of course, however, the interface 500 may be implemented in any desired environment. Furthermore, the aforementioned definitions may equally apply to the description below.

As shown, the interface 500 illustrates information including one or more interactive voice response selections made by a user (e.g. a customer, etc.). Furthermore, the interface 500 may be configured such that the user utilizing the interface 500 (e.g. the customer in context, etc.) is the central focus of the interface 500. The interface 500 may also show the most probable transaction readily available to an agent.

In this case, the most probable transaction readily available to an agent may include a transaction associated with activating a new subscription. Using the most probable transaction readily available to the agent, the agent may then enter any key data and select continue.

Figure 6:
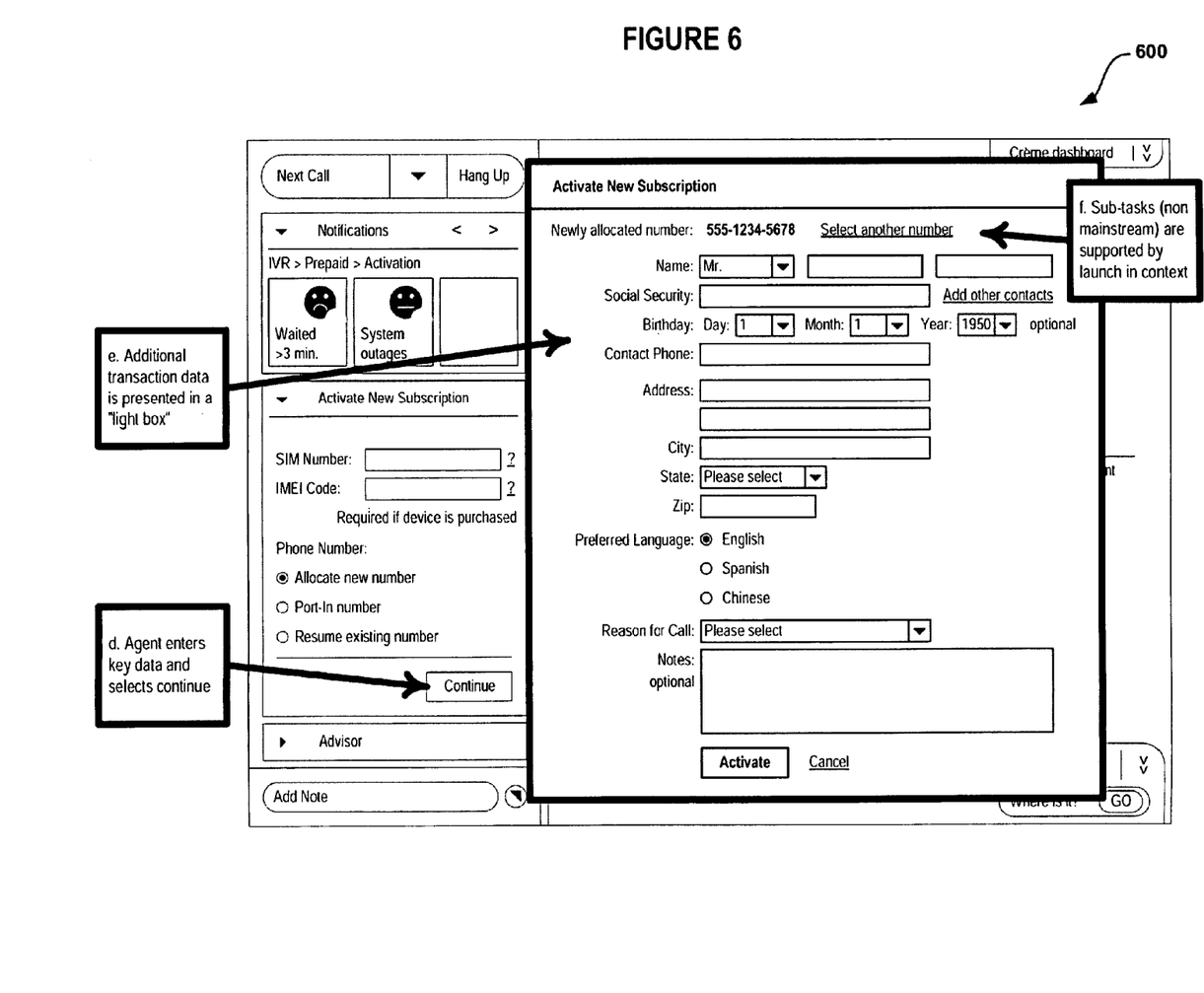
FIG. 6 shows an interface presented as a result of entering key data in the run time interface illustrated in FIG. 5, in accordance one embodiment.

FIG. 6 shows an interface 600 presented as a result of entering key data, in accordance one embodiment. As an option, the interface 600 may be implemented in the context of the details of FIGS. 1-5. Of course, however, the interface 600 may be implemented in any desired environment. The aforementioned definitions may equally apply to the description below.

As shown, when the agent enters key data and presses continue, additional transaction data is presented in an additional window. In this case, the additional window may include a window presented in the foreground with the previous window in the background. Additionally, the interface 600 may support sub-tasks (e.g. non-mainstream tasks, etc.) and allow the sub-tasks to be launched.

Figure 7:
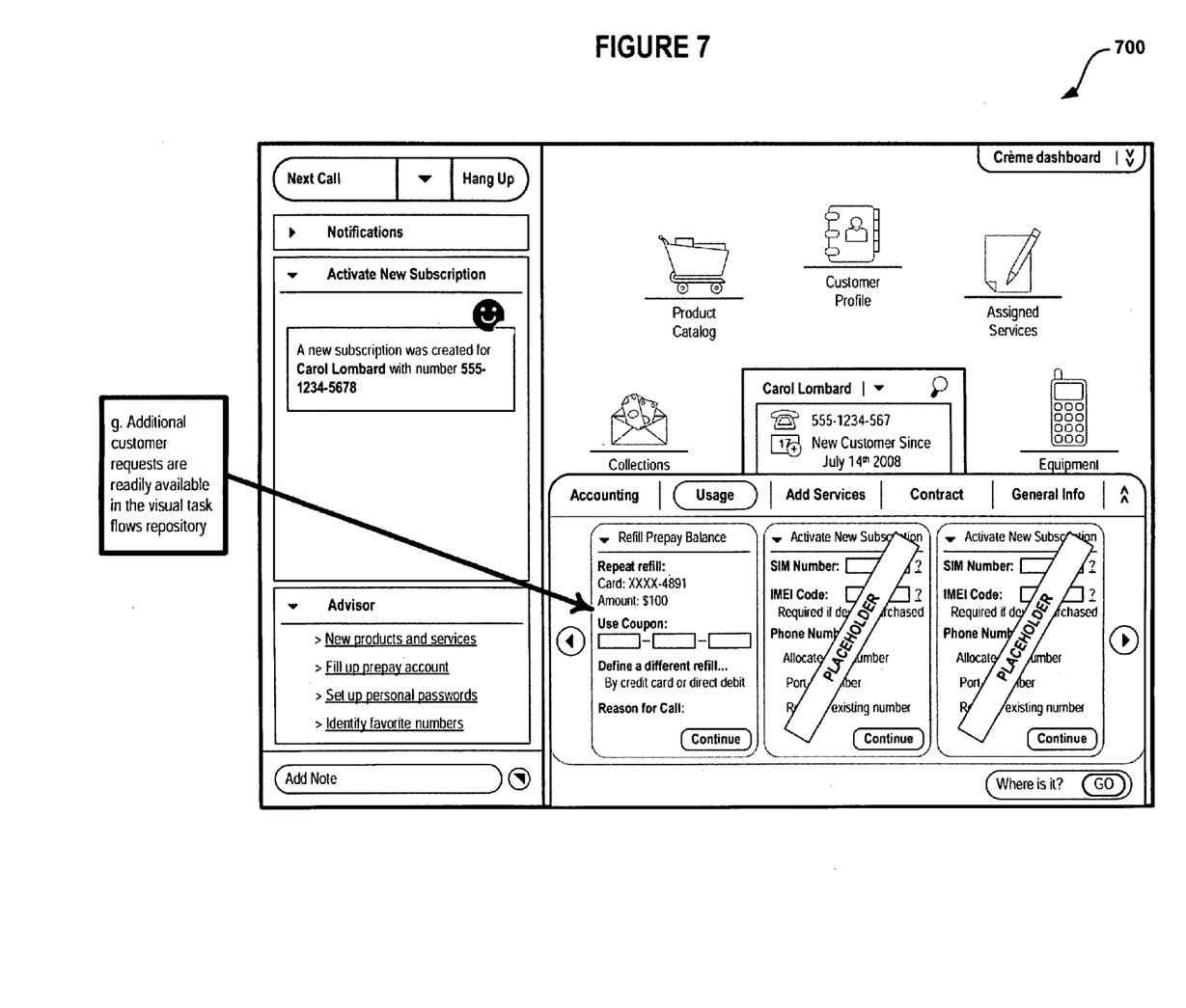
FIG. 7 shows a run time interface for manually selecting additional workflows based on an interaction with a user, in accordance with another embodiment.

FIG. 7 shows a run time interface 700 for selecting at least one predefined workflow based on an interaction with a user, in accordance with another embodiment. As an option, the interface 700 may be implemented in the context of the details of FIGS. 1-6. Of course, however, the interface 700 may be implemented in any desired environment. Again, the aforementioned definitions may equally apply to the description below.

As shown, the interface 700 may include additional customer requests that are readily available in the visual workflows repository. For example, the additional customer requests that are readily available in the visual workflows repository may include a refill prepay balance. Of course, in various other embodiments, the additional customer requests that are readily available may include any customer request that is readily available.

Figure 8:
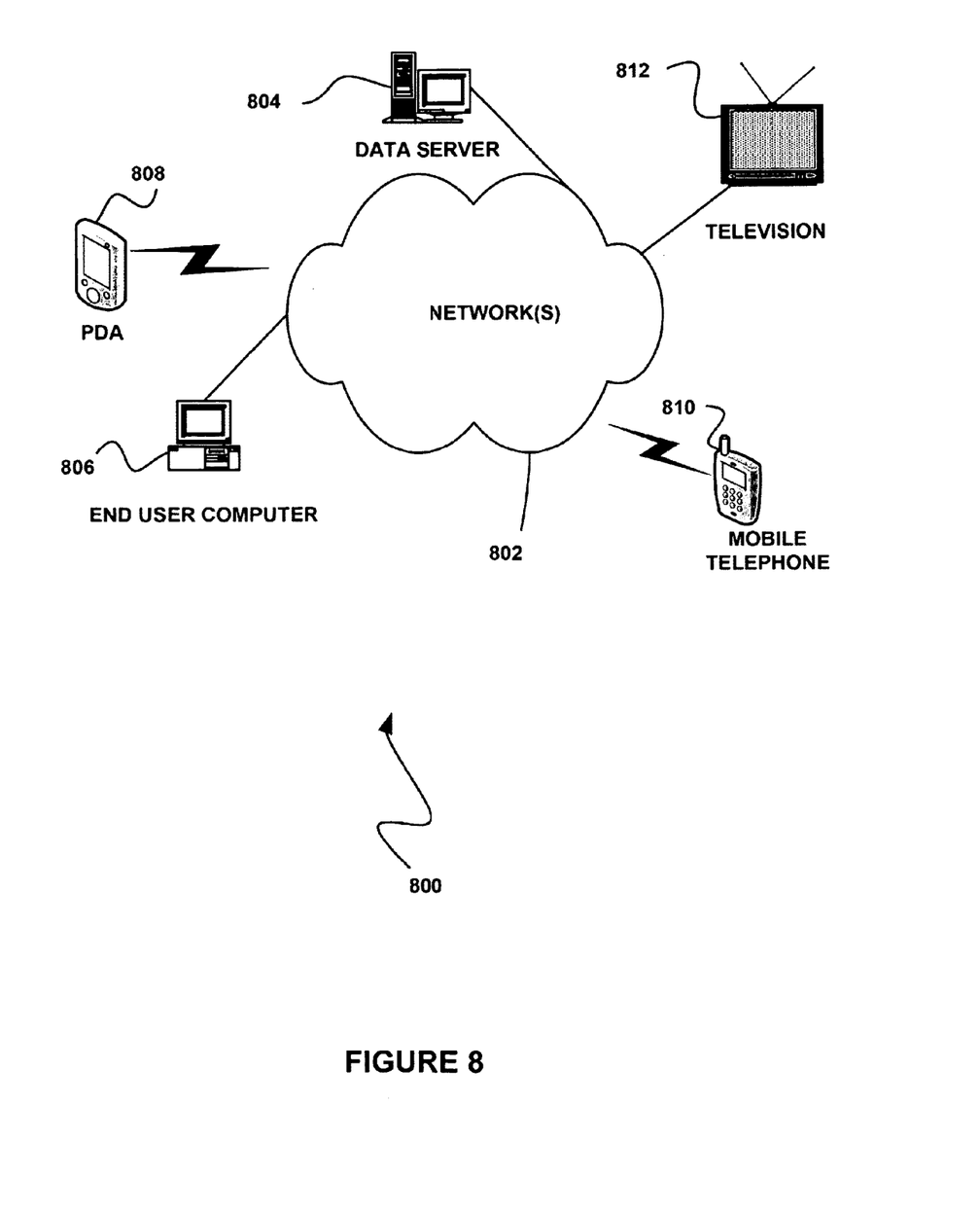
FIG. 8 illustrates a network architecture, in accordance with one embodiment.

FIG. 8 illustrates a network architecture 800 in which the various architecture and/or functionality of the various previous embodiments may be implemented. As shown, at least one network 802 is provided. In the context of the present network architecture 800, the network 802 may take any form including, but not limited to a telecommunications network, a local area network, a wireless network, a wide area network such as the Internet, peer-to-peer network, cable network, etc. While only one network is shown, it should be understood that two or more similar or different networks 802 may be provided.

Coupled to the network 802 is a plurality of devices. For example, a server computer 804 and an end user computer 806 may be coupled to the network 802 for communication purposes. Such end user computer 806 may include a desktop computer, lap-top computer, and/or any other type of logic. Still yet, various other devices may be coupled to the network 802 including a personal digital assistant (PDA) device 808, a mobile phone device 810, a television 812, etc.

Figure 9:
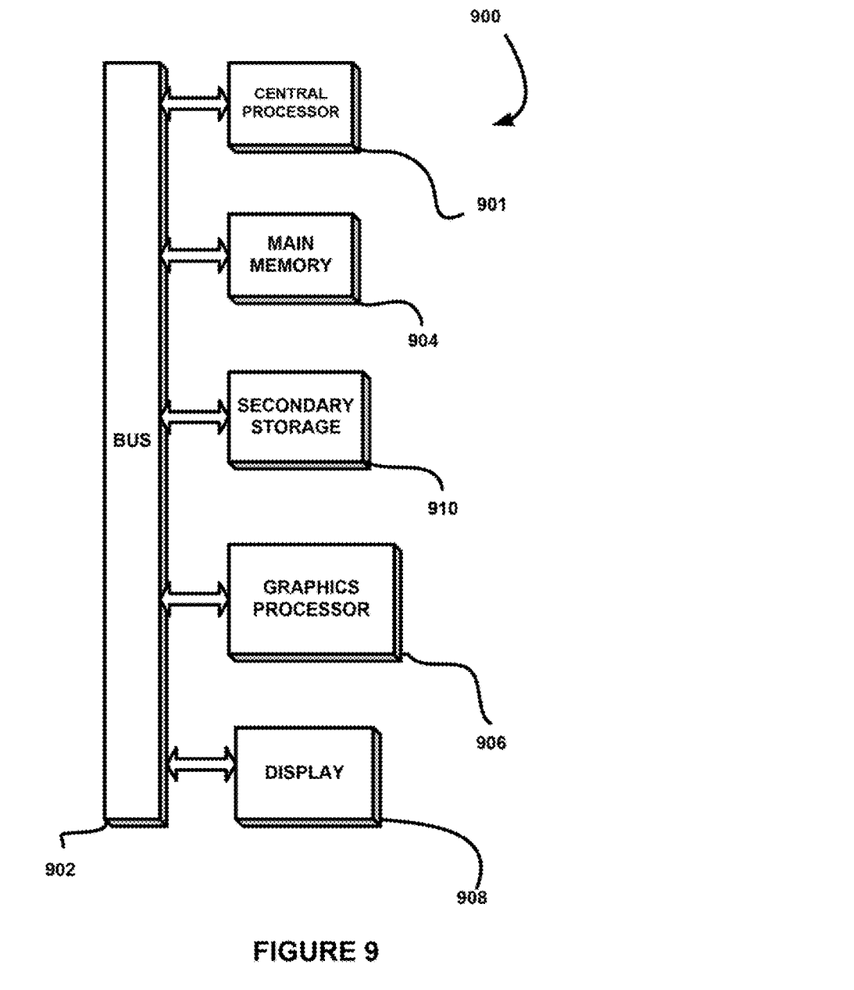
FIG. 9 illustrates an exemplary system, in accordance with one embodiment.

FIG. 9 illustrates an exemplary system 900 in which the various architecture and/or functionality of the various previous embodiments may be implemented. As shown, a system 900 is provided including at least one host processor 901 which is connected to a communication bus 902. The system 900 also includes a main memory 904. Control logic (software) and data are stored in the main memory 904 which may take the form of random access memory (RAM).

The system 900 also includes a graphics processor 906 and a display 908, i.e. a computer monitor. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 904 and/or the secondary storage 910. Such computer programs, when executed, enable the system 900 to perform various functions. Memory 904, storage 910 and/or any other storage are possible examples of computer-readable media.

In one embodiment, the architecture and/or functionality of the various previous figures may be implemented in the context of the host processor 901, graphics processor 906, an integrated circuit (not shown) that is capable of at least a portion of the capabilities of both the host processor 901 and the graphics processor 906, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, lap-top computer, and/or any other type of logic. Still yet, the system 900 may take the form of various other devices including, but not limited to, a personal digital assistant (PDA) device, a mobile phone device, a television, etc.

Further, while not shown, the system 900 may be coupled to a network (e.g. a telecommunications network, local area network, wireless network, wide area network such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising computer code for:
    storing, in memory of a call center system, a plurality of predefined workflows capable of being performed through the call center system, each predefined workflow including a plurality of tasks to be performed in a predefined sequence utilizing a user interface;
    tracking, by the call center system, call center operational statistics from interactions with a group affiliated with a user;
    receiving, within the call center system, an automatic alert in response to an identification of a predetermined change to the call center operational statistics;
    in response to receiving the automatic alert:
        obtaining the call center operational statistics,
        identifying, by the call center system, a first set of tasks that are likely to be performed by the group affiliated with the user and a second set of tasks that are not likely to be performed by the group affiliated with the user, based on the obtained call center operational statistics,
        predicting, by the call center system, that the user will perform at least one of the predefined workflows, using the first set of tasks identified as likely to be performed and the second set of tasks identified as not likely to be performed, and
        selecting, by the call center system, the at least one of the predefined workflows predicted to be performed by the user; and
    designing an interactive voice response (IVR) layer that maps a plurality of user selectable options to the selected workflows;
    in response to a call received by the call center system from the user, presenting to the user the selectable options through an IVR interface of the call center system;
    receiving, through the IVR interface of the call center system, a selection by the user of one of the selectable options;
    identifying the workflow mapped to the selected option; and
    launching, within the user interface for an agent of the call center system, the workflow identified as mapped to the selected option for allowing completion of the predefined sequence of tasks included in the launched workflow.

2. The computer program of claim 1, wherein the call center operational statistics are collected in real-time.

3. The computer program of claim 1, wherein the call center operational statistics describe user behavior.

4. The computer program of claim 1, wherein the call center operational statistics describe user behavior associated with a plurality of users.

5. The computer program of claim 1, wherein the call center operational statistics describe at least one business flow.

6. The computer program of claim 1, further comprising computer code for communicating a user identifier to a customer relationship manager (CRM).

7. The computer program of claim 6, wherein the user identifier is communicated from the IVR interface as part of an interactive voice response request.

8. A method, comprising:
    storing, in memory of a call center system, a plurality of predefined workflows capable of being performed through the call center system, each predefined workflow including a plurality of tasks to be performed in a predefined sequence utilizing a user interface;
    tracking, by the call center system, call center operational statistics from interactions with a group affiliated with a user;
    receiving, within the call center system, an automatic alert in response to an identification of a predetermined change to the call center operational statistics;
    in response to receiving the automatic alert:
        obtaining the call center operational statistics,
        identifying, by the call center system, a first set of tasks that are likely to be performed by the group affiliated with the user and a second set of tasks that are not likely to be performed by the group affiliated with the user, based on the obtained call center operational statistics,
        predicting, by the call center system, that the user will perform at least one of the predefined workflows, using the first set of tasks identified as likely to be performed and the second set of tasks identified as not likely to be performed, and
        selecting, by the call center system, the at least one of the predefined workflows predicted to be performed by the user; and
    designing an interactive voice response (IVR) layer that maps a plurality of user selectable options to the selected workflows;
    in response to a call received by the call center system from the user, presenting to the user the selectable options through an IVR interface of the call center system;
    receiving, through the IVR interface of the call center system, a selection by the user of one of the selectable options;
    identifying the workflow mapped to the selected option; and
    launching, within the user interface for an agent of the call center system, the workflow identified as mapped to the selected option for allowing completion of the predefined sequence of tasks included in the launched workflow.

9. An apparatus, comprising a processor for:
    storing, in memory of a call center system, a plurality of predefined workflows capable of being performed through the call center system, each predefined workflow including a plurality of tasks to be performed in a predefined sequence utilizing a user interface;
    tracking, by the call center system, call center operational statistics from interactions with a group affiliated with a user;

receiving, within the call center system, an automatic alert in response to an identification of a predetermined change to the call center operational statistics;

in response to receiving the automatic alert:
   obtaining the call center operational statistics,
   identifying, by the call center system, a first set of tasks that are likely to be performed by the group affiliated with the user and a second set of tasks that are not likely to be performed by the group affiliated with the user, based on the obtained call center operational statistics,
   predicting, by the call center system, that the user will perform at least one of the predefined workflows, using the first set of tasks identified as likely to be performed and the second set of tasks identified as not likely to be performed, and
   selecting, by the call center system, the at least one of the predefined workflows predicted to be performed by the user; and designing an interactive voice response (IVR) layer that maps a plurality of user selectable options to the selected workflows;

in response to a call received by the call center system from the user, presenting to the user the selectable options through an IVR interface of the call center system;

receiving, through the IVR interface of the call center system, a selection by the user of one of the selectable options;

identifying the workflow mapped to the selected option; and launching, within the user interface for an agent of the call center system, the workflow identified as mapped to the selected option for allowing completion of the predefined sequence of tasks included in the launched workflow.

\* \* \* \* \*